(12) United States Patent
Schroder et al.

(10) Patent No.: US 9,526,142 B2
(45) Date of Patent: Dec. 20, 2016

(54) LUMINAIRE CONTROLLER

(75) Inventors: Helmut Schroder, Wiesbaden (GE); Daniel Brand, Cologne (GE)

(73) Assignee: SCHREDER, Brussels (BE)

( * ) Notice: Subject to any disclaimer, the term of this patent is extended or adjusted under 35 U.S.C. 154(b) by 0 days.

(21) Appl. No.: 14/395,909

(22) PCT Filed: Apr. 27, 2012

(86) PCT No.: PCT/EP2012/057857
§ 371 (c)(1),
(2), (4) Date: Oct. 21, 2014

(87) PCT Pub. No.: WO2013/159833
PCT Pub. Date: Oct. 31, 2013

(65) Prior Publication Data
US 2015/0115807 A1    Apr. 30, 2015

(51) Int. Cl.
H05B 37/02    (2006.01)
H05B 33/08    (2006.01)
F21V 23/00    (2015.01)

(52) U.S. Cl.
CPC ......... H05B 33/0854 (2013.01); F21V 23/007 (2013.01); H05B 37/0218 (2013.01); H05B 37/0227 (2013.01); H05B 37/0254 (2013.01); H05B 37/0272 (2013.01); H05B 33/0842 (2013.01); Y02B 20/46 (2013.01)

(58) Field of Classification Search
CPC .............. H05B 37/029; H05B 37/0218; H05B 37/0272; H05B 37/02; H05B 37/0869

USPC .............. 315/312, 130, 152, 297, 294, 308, 317,315/158

See application file for complete search history.

(56) References Cited

U.S. PATENT DOCUMENTS

| | | | |
|---|---|---|---|
| 6,388,399 B1* | 5/2002 | Eckel et al. ................... | 315/312 |
| 2007/0057807 A1* | 3/2007 | Walters et al. ............... | 340/825 |
| 2010/0259931 A1* | 10/2010 | Chemel et al. .......... | 362/249.02 |
| 2010/0296285 A1* | 11/2010 | Chemel et al. ............... | 362/235 |
| 2011/0140611 A1* | 6/2011 | Elek et al. ..................... | 315/130 |
| 2012/0206050 A1* | 8/2012 | Spero ........................... | 315/152 |
| 2012/0235579 A1* | 9/2012 | Chemel et al. ............... | 315/152 |

OTHER PUBLICATIONS

ISA/EP International Search Report issued Dec. 14, 2012 re PCT Application No. PCT/EP2012/057857, filed Apr. 27, 2012.

* cited by examiner

Primary Examiner — Douglas W Owens
Assistant Examiner — Syed M Kaiser
(74) Attorney, Agent, or Firm — Patrick J. Daugherty; Driggs, Hogg, Daugherty & Del Zoppo Co., LPA (57) ABSTRACT

Described herein is a luminaire controller for a luminaire in which dimming signals can be provided to control the operation of the luminaire. The controller also includes an energy measurement module connected to a mains supply, a sensor module, a power switch, a central processing module and a ZigBee transceiver module. The controller, in addition to providing dimming signals in accordance with ambient lighting conditions sensed by a photocell in the sensor module, provides efficient energy metering. In one embodiment, the luminaire controller is directly mountable on a luminaire for control thereof.

18 Claims, 4 Drawing Sheets

LUMINAIRE CONTROLLER

FIELD OF THE INVENTION

The present invention relates to luminaire controllers, and is more particularly, although not exclusively, concerned with luminaire controllers having dimming capability.

BACKGROUND TO THE INVENTION

It is known to provide high intensity dimmable light-emitting diode (LED) luminaires for use in both indoor and outdoor spaces. On such LED luminaire is described in US-A-2012/0033400 for use as emergency ballast for car parks. The luminaire can have either a fixed output or a dimmable output and incorporates a movement sensor which can be used to change the illumination status of the luminaire. In addition, different turn-off schemes are described including a progressive turn-off with soft transitions between lighting levels.

In addition, it is known to use a light sensor in luminaires in a night mode operation. One such luminaire is described in GB-A-2459180 where a light sensor is incorporated into a luminaire system having a movement sensor and an adjuster for adjusting the output from the luminaire in accordance with sensed movement and/or sensed light levels.

Another lighting system that includes both presence detection and light level detection is described in EP-A-0447136. A dimmable electronic ballast is connected to a presence detector and a light detector to control its operation in accordance with conditions in a localised area associated with the dimmable electronic ballast.

With the requirement for more efficient, more environmentally friendly lighting systems, NEMA photocell sockets are used, together with NEMA photocells, to control the switching on and switching off of associated luminaires in accordance with ambient lighting conditions. [NEMA refers to the National Electrical Manufacturers Association and is a trade association for the electrical manufacturing industry whose member companies manufacture products used in the generation, transmission and distribution, control and end-use of electricity.] However, such systems are not readily dimmable without the modification, and, in particular, extra wires need to be provided between the photocell and a controller within the socket.

SUMMARY OF THE INVENTION

It is therefore an object of the present invention to provide a luminaire controller having a dimming functionality.

It is another object of the present invention to provide a luminaire controller having a photocell which can control the dimming functionality.

It is a further object of the present invention to provide a luminaire controller with dimming functionality that can be mounted directly onto the luminaire which it is to control.

It is yet a further object of the present invention to provide a luminaire controller with dimming functionality that can be implemented with either a '0-10V' or a DALI type receptacle.

It is yet another object of the present invention to provide a luminaire controller that provides smart metering of energy used by the luminaire on which it is mounted.

In accordance with a first aspect of the present invention, there is provided a luminaire controller comprising:

a housing;

mains input terminals mounted within the housing;

a power switch module mounted within the housing and connected to a mains supply;

a central processing module mounted within the housing; and a communications module mounted within the housing;

characterised in that the luminaire controller further comprises a dimming interface mounted within the housing and controllable by the central processing module, and a sensor module mounted in the housing and providing control signals to the central processing module in accordance with ambient conditions.

In accordance with the present invention, the luminaire controller has the advantage that it can be used with luminaires that already having dimming functionality as well as with luminaires that do not.

In one embodiment, the sensor module comprises a photocell for sensing ambient lighting conditions in the vicinity of the housing. In this embodiment, the sensed ambient lighting conditions can be used to control dimming of the luminaire.

The sensor module may also comprise a temperature sensor for sensing ambient temperature conditions within the housing, the temperature sensor providing temperature compensating signals to the central processing module.

In an embodiment, the dimmable interface is operated in accordance with control signals provided by the sensor module. Additionally or alternatively, the dimmable interface may be operated in accordance with a pre-programmed dimming profile.

Advantageously, the luminaire controller of the present invention further comprises interfaces for '0-10V' and DALI protocols respectively.

The luminaire controller may be directly mountable on a luminaire. In this case, a plug connector connecting directly with a complementary plug connector within the luminaire is provided, the plug connector providing at least five connections with the luminaire.

Alternatively, the luminaire controller may be mountable on either a '0-10V'-type or a DALI-type receptacle provided on a luminaire.

If the luminaire controller is to be used on a luminaire with no ambient condition sensing, it further comprises at least a three-pin NEMA connector connectable to a luminaire.

However, if dimming is required, the dimming interface comprises at least one additional connector for connection with a luminaire. Such a connector may be an optical interface, at least one additional arcuate pin, a central stereo-type plug, or a coaxial type plug.

In one embodiment, the luminaire controller further comprises at least one service link through which system updates can be uploaded.

In another embodiment, the luminaire controller further comprises an energy measurement module connected to the mains input terminals.

Ideally, the housing comprises at least one transparent or translucent window through which ambient conditions can be determined.

In accordance with a second aspect of the present invention, there is provided a luminaire comprising a luminaire controller as described above.

BRIEF DESCRIPTION OF THE DRAWINGS

For a better understanding of the present invention, reference will now be made, by way of example only, to the accompanying drawings in which.

DESCRIPTION OF THE INVENTION

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Luminaires are well-known for lighting large areas and can be used, for example, in street lighting applications. Each luminaire comprises a plurality of light-emitting diode (LED) elements and at least one driver circuit for controlling the operation of the LEDs. The LED driver circuits may be controlled to switch the driver circuit OFF completely during the day if there is a switch provided ahead of the driver circuit. This may be implemented using a switching relay that includes a ZigBee interface switching mains power and has the required level of isolation.

ZigBee is a trademark of the ZigBee Alliance which provides a specification for a suite of high level communication protocols using small, low-power digital radios based on an IEEE 802 standard for personal area networks. ZigBee is particularly useful in radio frequency (RF) applications where low data rates, long battery life and secure networking are required, and where periodic or intermittent data transmission or a single signal transmission is required from a sensor or other input device.

Another way of controlling the LED driver circuits is to use a '0-10V' input or digital addressable lighting interface (DALI) input. In this case, the output current of the driver circuit is set to 0 when it is desired that the associated luminaire is switched OFF. Nevertheless, there is always a remaining quiescent current that can vary from one driver circuit to another.

DALI is a technical standard for network-based systems for controlling lighting in buildings. It was established as a successor to '0-10V' lighting control systems, but both systems are still currently used. DALI is an open standard which is an alternative to digital signal interface (DSI) on which it is based. The DALI standard also incorporates a communications protocol and electrical interface for lighting control networks.

A conventional DALI network comprises a controller and one or more lighting devices, for example, electrical ballasts and dimmers, each lighting device having a DALI interface. The controller monitors and controls each lighting device by means of a bi-directional data connection. The DALI protocol allows lighting devices to be individually addressed as well as to be addressed in groups.

In a DALI network, each lighting device is assigned a unique static address in the numeric range from 0 to 63 making it possible to have 64 devices in a standalone system. Alternatively, DALI can be used as a subsystem via DALI gateways to address more than 64 devices. Data is transferred between the controller and each device by means of an asynchronous, half-duplex, serial protocol over a two-wire differential bus with a fixed data transfer rate, typically of 1200 bits per second. The network may be arranged in a bus or star topology or a combination thereof. As the DALI system is not classified as being separated extra low voltage (SELV), it can be run next to mains cables or within a multi-core cable that includes mains power. Data is transmitted using Manchester encoding (also known as phase encoding) and has a high signal-to-noise ratio which enables reliable communication in the presence of a large amount of electrical noise.

In its simplest form, the present invention relates to a luminaire controller incorporating a photocell which has a conventional three-pin plug or connector that meets NEMA standards. The luminaire controller can simply be implemented on existing luminaires which have a conventional three-pin socket that meets NEMA standards. The luminaire controller can be used with either a DALI control receptacle or a '0-10V' control receptacle, without any modification. Whilst the luminaire controller can provide dimming signals, this functionality cannot be used when the luminaire controller is used with conventional control receptacles having only three connections.

In another embodiment, the luminaire controller includes a first part of an optical interface through which dimming control signals can be transmitted to a modified control receptacle. The modified control receptacle also has a second part of an optical interface for receiving the transmitted signals in the form of light pulses. Such an optical interface avoids the need for additional wiring between the luminaire controller and the modified receptacle as the dimming control signals are optical signals comprising modulated light pulses, generated by an optical transmitter forming part of the luminaire controller in accordance with sensed ambient light conditions, which are received by an optical receiver forming part of the modified control receptacle. The modified control receptacle may either be a modified '0-10V' control receptacle, or a modified DALI control receptacle. The control receptacle in accordance with the present invention is similar to conventional '0-10V' receptacles and/or conventional DALI receptacles but which have been modified to incorporate the second part of the optical interface as described above.

Naturally, the luminaire controller has a sensor for detecting ambient light levels in the vicinity of the luminaire. The sensor may comprise any suitable photosensitive or photoelectric device that converts incident light into electrical signals. The electrical signals are used to control an optical generator which generates the modulated light pulses in accordance with the received electrical signals. The optical generator forms a first part of the optical interface. A second part of the optical interface is housed in the control receptacle and comprises the optical receiver in the form of a photosensitive or photoelectric device that converts the received modulated optical pulses into electrical control signals for providing dimming signals for a luminaire on which the control receptacle and the luminaire controller is mounted.

In addition to the optical interface, conventional electrical connections are provided between the luminaire controller and the control receptacle by way of a NEMA three-pin plug provided on the luminaire controller and a NEMA three-pin socket provided in the control receptacle which is mounted on a luminaire. Such a luminaire controller may include other functionality as will be described in more detail below.

In another embodiment of the invention, the luminaire controller may have additional pins which engage with modified control receptacles having the same number of additional pins. For example, a five-pin pin connector may be implemented which is plugged into a five-pin socket in a modified control receptacle, either '0-10V' or DALI. In this embodiment, one of the additional pins may be used for providing a dimming signal from the luminaire controller to the control receptacle and then to a dimmable ballast to control the light level of the luminaire between 0% and 100%.

In a further embodiment, the luminaire controller may be mounted directly on the luminaire, that is, without the need for a control receptacle. In this embodiment, connections from the luminaire controller passes through a hole in a plate provided on top of the luminaire and connections are made directly with a dimmable ballast to control the light level of the luminaire between 0% and 100%.

Figure 1:
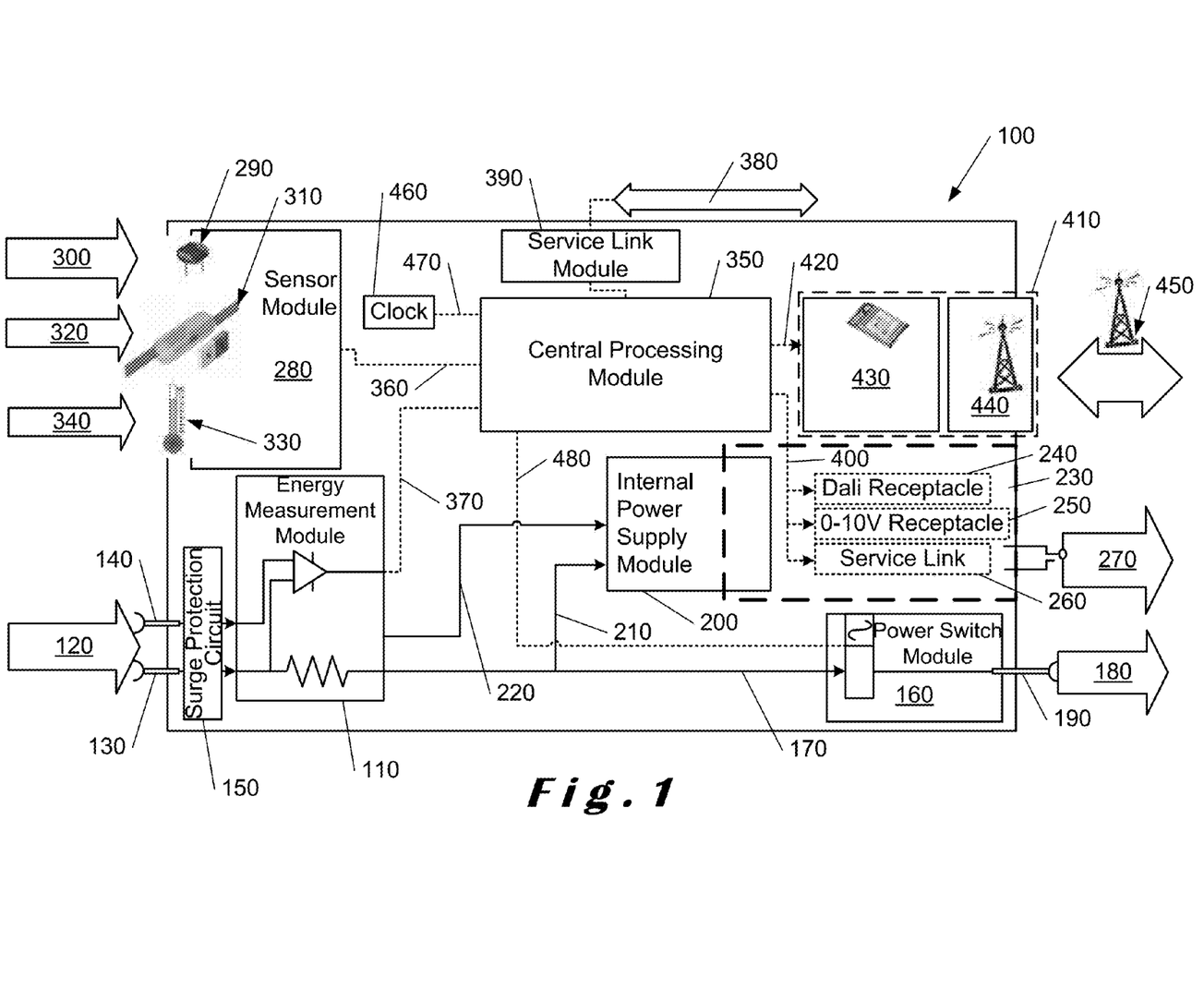
FIG. 1 illustrates a schematic block diagram of the components in a luminaire controller in accordance with the present invention.

FIG. 1 illustrates a block diagram of a luminaire controller 100 in accordance with the present invention. The luminaire controller 100 comprises an energy measurement module 110 connected to a mains supply 120 via a live (L) line 130 and a neutral (N) line 140 and a surge protection circuit 150. The surge protection circuit 150 prevents damage to components within the luminaire controller 100 in the case of a spike in the mains supply 120.

The energy measurement module 110 is electrically connected to a power switch module 160 on line 170, the power switch module 160 switching power to load 180 via line 190. In this case, the load 180 comprises a luminaire (not shown).

An internal power supply module 200 is electrically connected to line 170 via a connecting line 210. The internal power supply module 200 is also connected to the energy measurement module 110 via a connecting line 220.

Associated with the internal power supply module 200 is an isolated supply 230 which provides proper isolation in accordance with local requirements. The isolated supply 230 includes functionality for either a DALI receptacle 240 or a '0-10V' receptacle 250 and includes a service link 260. The service link 260 provides a dimming signal 270 for the luminaire (not shown) if the luminaire has dimming functionality, the dimming signal being between 0% and 100%.

A sensor module 280 is provided and comprises a photocell 290 for sensing ambient or environmental light level 300, a reed switch/magnet arrangement 310 connected to a service switch 320, and a temperature sensor 330 for sensing ambient or environmental temperature level 340. It will be appreciated that the elements in the sensor module 280 are shown as schematic illustrations and may be implemented in any appropriate form.

A central processing module 350 is connected to receive output signals from both the sensor module 280 via a data transfer line 360, and the energy measurement module 110 via a data transfer line 370. The central processing module 350 comprises central processing functions which include: switching and dimming logic; measurement and control configuration logic; and calibration logic. A service link 380 is connected to the central processing module 350 via a service link interface 390.

As shown, the central processing module 350 is connected to provide control signals to the isolated 4 kV supply 230 via data transfer line 400 and also to a transmitter module 410 via data transfer line 420. The transmitter module 410 comprises an RF ZigBee transceiver 430 and a ZigBee antenna 440. The ZigBee transceiver 430 wirelessly interacts with other ZigBee-configured transceivers 450. It will be appreciated that although only one other ZigBee transceiver 450 is shown, this is representative of a ZigBee wireless network.

In addition, a real-time clock (RTC) 460 is provided and is connected to the central processing module 350 via a data transfer line 470. The central processing module 350 is also connected to the power switch 160 via a data transfer line 480.

Referring now to the elements of the sensor module 310 in more detail, the photocell 290 detects dawn and dusk conditions as well as low light situations and has an adjustable trip point with hysteresis; the reed switch/magnet arrangement 310 provides a non-invasive method of initialising the luminaire controller including providing a way of providing firmware updates, diagnostics and calibration as well as a metering calibration check using blinking LEDs; and the temperature sensor 330 measures the temperature inside the housing so that it can protect the electronics from excessive temperatures and provide temperature compensation corrections for the energy measurement module 110 to the central processing module 350.

The energy measurement module 110 provides 1% accuracy for energy billing over a range of 0.1 VA to 1500 VA with zero crossing detection of mains voltage and current. In addition, the energy measurement module 110 has low power consumption.

The RTC 460 is accurate and stable providing an accuracy levels better than 5 seconds in each 24 hours or 1 minute in each week. Ideally, the RTC 460 keeps time for more than 72 hours when no power is applied. It requires no maintenance.

The internal power supply module 200 has a multi-range input, typically between 90 to 300 Vac, and provides a DC output at 3.3V and 500 mA. For the isolated supply 230, a voltage of between 18 to 20V at 25 mA is provided with non-regulated ripple which is less than 200 mV. The internal power supply module 200 is efficient in that its total power consumption is less than 0.3 W.

The power switch 160 has a maximum continuous current of 5 A and can switch ON at a voltage zero crossing and switch OFF at a current zero crossing. It has low permanent activation current and power.

The central processing module 350, as described above, has the ability to process all required functions. It is a low powered module having permanent non-volatile (NV) storage.

The RF ZigBee module 410 is fully compatible with the current version of the Owlet Nightshift System and has lower cost but higher range. The Owlet Nightshift System comprises a tele-management system for monitoring, controlling, metering and managing outdoor lighting. It is based on open technologies and saves energy, reduces greenhouse gas emissions, improves outdoor lighting reliability and lowers maintenance cost. In the Owlet Nightshift System, each individual light point can be switched OFF/ON or dimmed at any time. Information relating to operating status, energy consumption and failures of the system can be reported and stored in a database with an exact time stamp and geographical location. The system ensures that the correct and reliable level of lighting is provided on the street with reduced operating costs. Due to its open architecture, the Owlet Nightshift System makes public lighting networks part of the internet thereby enabling web-based applications for the control of such public lighting networks.

The DALI interface 240 provides an output according to IEC 62386 and can support 1 to 4 slaves. The '0-10V' interface 250 is configured in accordance with EN60929 Annex E for a maximum of 16 clients. In operation, either the DALI interface 240 or the '0-10V' interface 250 is used in accordance with the type of control receptacle with which the luminaire controller 100 is to be used.

The service link 380 operates at 115 kbaud or better. Through the service link interface 390, firmware updates for all components with firmware can be implemented. In addition, full diagnostics can be carried out on the vital functionality of the system whilst allowing fast calibration and providing accessibility after the luminaire controller has been sealed.

The luminaire controller in accordance with the present invention can be used with any of the international voltages, namely, 120V, 208V, 240V and 277V for North America, 230V for Europe and other countries. In addition, 110V and 220V may be used in some other parts of the world. The controller also fits with the existing Owlet Nightshift System as described above with a segment controller and a SQL-based user interface.

In accordance with the present invention, ambient light conditions 300 sensed by the photocell 290 in the sensor module 280 provides an output signal indicative of the amount of light sensed which is forwarded to the central processing module 350 for processing. If the output signal is below a predetermined threshold value, then the central processing module 350 provides a signal for the service link 260 to provide a dimming signal 270 for the luminaire provided it supports a dimming capability. The dimming signal 270 is transmitted from the luminaire controller to the luminaire in several ways as will be described in more detail below.

Although not shown, the photocell 290 generates an electrical signal which is transferred to the central processing module 350 on data transfer line 360. The electrical signal is converted to signals compatible for the service link 620 to provide dimming signal 630 for the luminaire (not shown).

Figure 2:
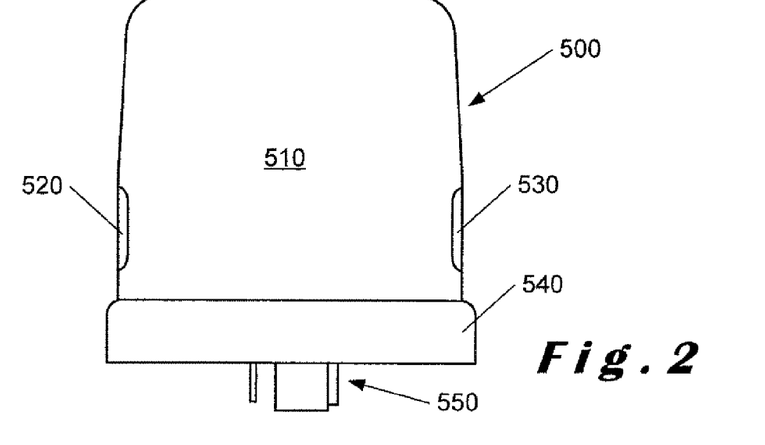
FIG. 2 illustrates a side view of a first embodiment of a luminaire controller in accordance with the present invention.
Figure 3:
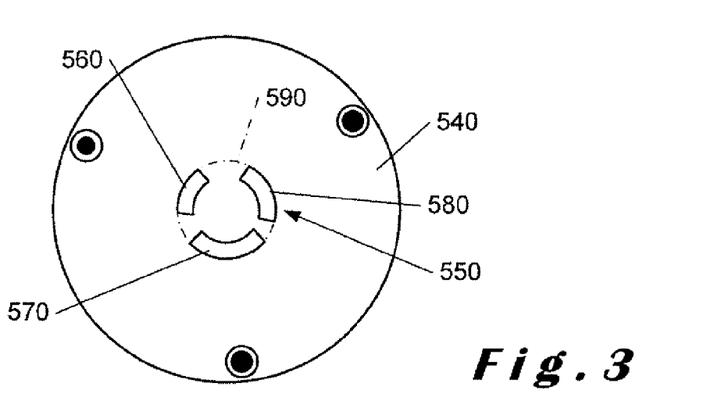
FIG. 3 illustrates a bottom view of the luminaire controller in FIG. 2.

FIGS. 2 and 3 respectively illustrate a side view and a bottom view of on embodiment of a luminaire controller 500 in accordance with the present invention. The luminaire controller 500 comprises a housing 510 having transparent windows 520, 530 and which is mounted on a base 540. The base 540 includes a standard three-pin NEMA connector 550 which is shown more clearly in FIG. 3.

Although the windows 520, 530 are described as being transparent, they could also be made of a translucent material through which the ambient light can be sensed.

As shown in FIG. 3, the standard three-pin NEMA connector 550 comprises three arcuate connector pins 560, 570, 580 arranged on the circumference for a circle 590 as indicated by a dotted line. Each pin 560, 570, 580 comprises a segment of the circle 590 and each has a different length to the other pins. This ensures that the connector 550 can only be inserted into its associated socket connector (not shown) in one position and then turned to lock the pin/socket connection in place.

Figure 4:
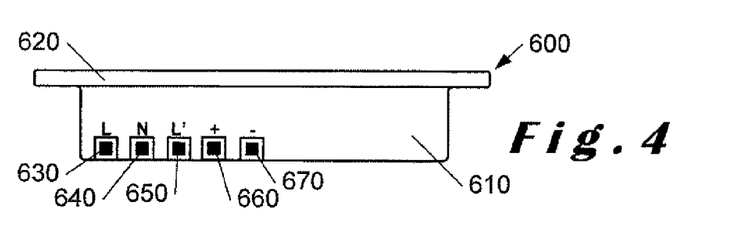
FIG. 4 illustrates a side view of a '0-10V' control receptacle.

In FIG. 4, a '0-10V' control receptacle 600 is shown which comprises a housing 610 and an upper surface 620. Standard '0-10V' connections 630, 640, 650, 660, 670 are provided in the housing 610 as shown. Three mains connections 630, 640, 650 are provided together with the '0-10V' specific connections 660, 670, namely, low voltage connections.

The upper surface 620 includes a three-pin NEMA socket (not shown) into which the standard three-pin NEMA connector 550 of the luminaire controller 500 can be inserted. The socket comprises three arcuate slots for receiving the corresponding arcuate pins 560, 570, 580 of the connector 550. As is the case with the three-pin NEMA connector 550, the arcuate slots have different sizes to ensure that the correct pin 560, 570, 580 is engaged with the correct slot before being locked in position by rotation of the luminaire controller 500 relative to the '0-10V' control receptacle.

Figure 5:
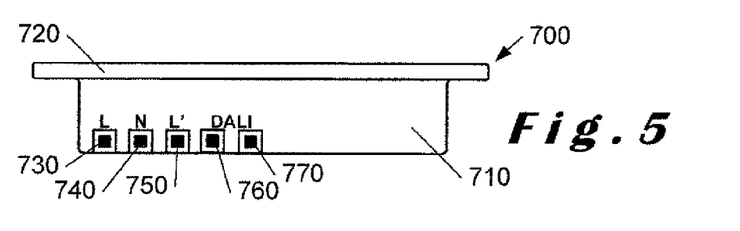
FIG. 5 illustrates a side view of a DALI control receptacle.

In FIG. 5, a modified DALI control receptacle 700 is shown which comprises a housing 710 and an upper surface 720. Standard DALI connections 730, 740, 750, 760, 770 are provided in the housing 710 as shown. Three mains connections 730, 740, 750 are provided together with the DALI specific connections 760, 770, namely, low voltage connections.

The upper surface 720 includes a three-pin NEMA socket (not shown) into which the standard three-pin NEMA connector 550 of the luminaire controller 500 can be inserted. The socket comprises three arcuate slots for receiving the corresponding arcuate pins 560, 570, 580 of the connector 550. As is the case with the three-pin NEMA connector 550, the arcuate slots have different sizes to ensure that the correct pin 560, 570, 580 is engaged with the correct slot before being locked in position by rotation of the luminaire controller 500 relative to the DALI control receptacle.

Figure 6:
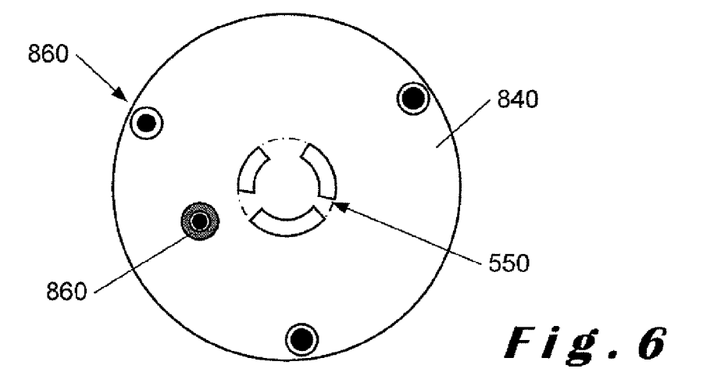
FIG. 6 illustrates a bottom view of a second embodiment of a luminaire controller in accordance with the present invention.

Turning now to FIG. 6, another embodiment of a luminaire controller 800 in accordance with the present invention is shown. Its side view is identical to the side view of luminaire controller 500 but it has a modified base 840 as shown. As before, the base 840 includes a three-pin NEMA connector 550 for connection to either a '0-10V' control receptacle or a DALI control receptacle. However, in this embodiment, the luminaire controller 800 includes a first part of an optical interface 860 and the '0-10V' control receptacle or the DALI control receptacle needs to be modified to include a second part of the optical interface.

The first part of the optical interface comprises the service link 260 in the isolated supply 230 as shown in FIG. 1 which converts electrical signals received from the central processing module 350 into optical signals forming the dimming signal 270 for the luminaire. In this embodiment, the dimming signal 270 comprises an optical signal but it may be an electrical signal in other embodiments as will be described below. The second part of the optical interface, in either the '0-10V' control receptacle or the DALI control receptacle, comprises an optical receiver for receiving the optical signal and converts it into an electrical control signal to control dimming of the luminaire.

The optical interface 860 provides a further connection between the luminaire controller 800 and the control receptacle (either '0-10V' or DALI) in which it is placed to provide a dimming signal in accordance with the ambient light conditions sensed by the photocell 290 (FIG. 1) or in accordance with a predetermined dimming profile. For each of the modified '0-10V' of DALI control receptacle, unidirectional optical communication can be established when the luminaire controller 800 is plugged into either one of the two modified receptacles. Light-emitting diodes (LEDs) are used to generate appropriate signal pulses in accordance with the signal to be transferred from the luminaire controller 800 and modified receptacle.

Although the communication is described as being unidirectional in this embodiment, it will be appreciated that the communication may also be bi-directional. In this case, the luminaire controller 800 and the modified receptacle with which it is to be used include both an optical transmitter and an optical receiver.

Figure 7:
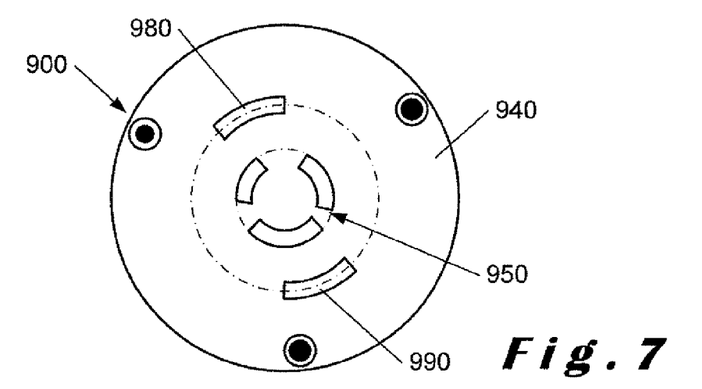
FIG. 7 illustrates a bottom view of a third embodiment of a luminaire controller in accordance with the present invention.

In another embodiment, as shown in FIG. 7, a luminaire controller 900 is similar to luminaire controller 500 shown in FIG. 2, but it has a modified connector arrangement on its base 940 that comprises a three-pin NEMA connector 950 together with two further arcuate pins 980, 990 which are located on another circle which has a larger diameter than the circle on which the NEMA connector 950 is based. These pins 980, 990 are intended to provide further connections with control receptacle in which the luminaire controller 900 is mounted. This means that the control receptacle has, in addition to its standard NEMA socket with three slots, two further slots are provided for receiving the additional pins 980, 990. The control receptacle in this embodiment is another modified '0-10V' or DALI control receptacle. Although two additional pins 980, 990 are shown, it will be appreciated that more than two additional pins may be implemented if required.

Figure 8:
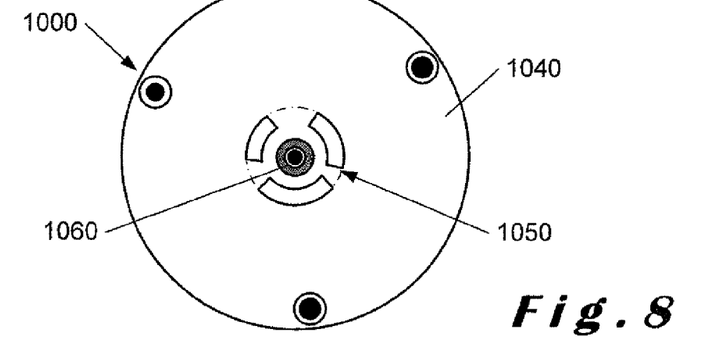
FIG. 8 illustrates a bottom view of a fourth embodiment.

In FIG. 8, another luminaire controller 1000 is shown in which its base 1040 includes a standard three-pin NEMA connector 1050 together with an interface 1060 located at its centre. The interface 1060 may comprises an optical interface as described above with reference to luminaire controller 800 shown in FIG. 6. Again, the control receptacle with which the luminaire controller 1000 is to be used is modified accordingly to provide the second part of the interface (not shown).

Alternatively, the interface 1060 may be an electrical pin connector comprising at least one additional connection between the luminaire controller 1000 and the control receptacle in which it is to be mounted, the control receptacle being modified to have an additional socket to receive the additional pin connector. Such a pin connector may comprise a stereo-type plug or a coaxial type plug, each providing two connections. Alternatively, the control receptacle may include the additional pin connector and the luminaire controller may include the socket for receiving the additional pin connector.

Figure 9:
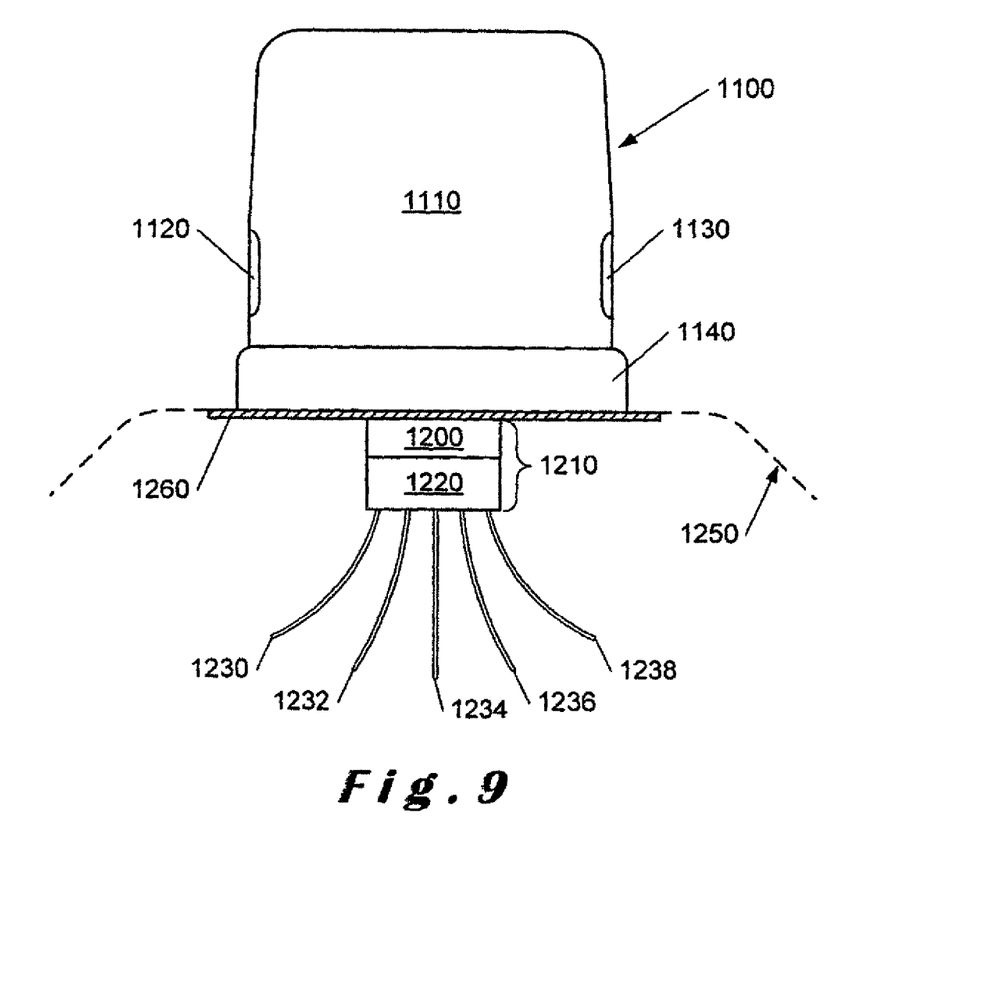
FIG. 9 illustrates a sectioned side view of a fifth embodiment of a luminaire controller in accordance with the present invention mounted directly on a luminaire.

In FIG. 9, a further embodiment of a luminaire controller 1100 is shown. Luminaire controller 1100 is similar to luminaire controller 500 shown in FIG. 1 and includes a housing 1110 having two transparent windows 1120, 1130 mounted on a base 1140. As described above, the windows 1120, 1130 may also be made from a translucent material which allows sensing of the ambient light etc. Instead of the three-pin NEMA connector 550, one part 1200 of a plug connector 1210 is provided on its base 1140. In this embodiment, there is no need for a control receptacle as the luminaire controller 1100 is mounted directly on the top of a luminaire 1250 as indicated by the dotted line. A mounting plate 1260 is provided onto which the luminaire controller 1100 is bolted (not shown). Inside the luminaire, a second part 1220 of the plug connector 1210 is provided. As shown, the second part 1220 of the plug connector 1210 has five wires 1230, 1232, 1234, 1236, 1238 which connect the luminaire controller 1100 to a power supply (not shown) that is equivalent to the power supply 120 (FIG. 1) and to other functionality within the luminaire. One of the wires 1230, 1232, 1234, 1236, 1238 is connected for providing the dimming signal 270 via the service link 260 as shown in FIG. 1. Although five wires are shown, it will be appreciated that more than five wires may be present in accordance with the particular luminaire configuration.

It will be appreciated that using ZigBee, one luminaire controller in accordance with the present invention can either be used for a single luminaire with which it is associated or with a number of luminaires within the vicinity and which can be controlled over the ZigBee network. In addition, although the invention has been described using ZigBee networks, any other suitable communication network can be implemented.

Although the present invention has been described with reference to specific embodiments, it will be appreciated that other embodiments may be implemented without departing from the scope of the present invention.

The invention claimed is:

1. A luminaire controller configured for being mountable to a luminaire and for being operable for controlling the operation of the luminaire to which it is mounted, the luminaire controller comprising:
    a housing mountable to the luminaire;
    mains input terminals mounted within the housing and configured for being connected to a mains supply;
    a power switch module mounted within the housing and configured for being connected to the mains supply by way of the mains input terminals;
    a central processing module mounted within the housing and configured for being connected for controlling central processing functions of the luminaire controller;
    a communications module mounted within the housing and configured for interacting wirelessly with at least one other communications module;
    a dimming interface mounted within the housing and configured for being controlled by the central processing module, the dimming interface including interfaces for both '0-10V' and DALI protocols; and
    a sensor module mounted in the housing and configured for providing control signals to the central processing module in accordance with sensed ambient conditions;
    wherein the luminaire controller is configured to be mountable on one of: a '0-10V'-type receptacle and a DALI-type receptacle provided on the luminaire, the central processing module being configured for switching between the '0-10V' interface and the DALI interface in accordance with the type of receptacle and the protocol associated therewith.

2. The luminaire controller according to claim 1, wherein the sensor module comprises a photocell for sensing ambient lighting conditions in the vicinity of the housing.

3. The luminaire controller according to claim 1, wherein the sensor module comprises a temperature sensor for sensing ambient temperature conditions within the housing, the temperature sensor providing temperature compensating signals to the central processing module.

4. The luminaire controller according to claim 1, wherein the dimmable interface is operated in accordance with control signals provided by the sensor module.

5. The luminaire controller according to claim 1, wherein the dimmable interface is operated in accordance with a pre-programmed dimming profile.

6. The luminaire controller according to claim 1, directly mountable on the luminaire.

7. The luminaire controller according to claim 6, further comprising:

a pin connector connecting directly with a complementary plug connector within the luminaire, the plug connector providing at least five connections with the luminaire.

8. The luminaire controller according to claim 7, further comprising:
at least a three-pin NEMA connector connectable to the luminaire.

9. The luminaire controller according to claim 1, wherein the dimming interface comprises at least one additional connector for connection with the luminaire.

10. The luminaire controller according to claim 9, wherein the at least one additional connector comprises an optical interface.

11. The luminaire controller according to claim 9, wherein the at least one connector comprises at least one additional arcuate pin.

12. The luminaire controller according to claim 9, wherein the at least one connector comprises a central stereo-type plug.

13. The luminaire controller according to claim 9, wherein the at least one connector comprises a coaxial type plug.

14. The luminaire controller according to claim 1, further comprising at least one service link through which system updates can be uploaded.

15. The luminaire controller according to claim 1, further comprising an energy measurement module connected to the mains input terminals.

16. The luminaire controller according to claim 1, wherein the housing comprises at least one transparent window through which ambient conditions can be determined.

17. A luminaire, comprising:
a luminaire controller, which comprises:
a housing mountable to the luminaire;
mains input terminals mounted within the housing and configured for being connected to a mains supply;
a power switch module mounted within the housing and configured for being connected to the mains supply by way of the mains input terminals;
a central processing module mounted within the housing and configured for being connected for controlling central processing functions of the luminaire controller;
a communications module mounted within the housing and configured for interacting wirelessly with at least one other communications module;
a dimming interface mounted within the housing and configured for being controlled by the central processing module, the dimming interface including interfaces for both '0-10V' and DALI protocols; and
a sensor module mounted in the housing and configured for providing control signals to the central processing module in accordance with sensed ambient conditions;
wherein the luminaire controller is configured to be mountable on one of: a '0-10V'-type receptacle and a DALI-type receptacle provided on the luminaire, the central processing module being configured for switching between the '0-10V' interface and the DALI interface in accordance with the type of receptacle and the protocol associated therewith.

18. A method for controlling a luminaire, comprising the steps of:
mounting a luminaire controller on one of: a '0-10V'-type receptacle and a DALI-type receptacle provided on the luminaire;
connecting mains input terminals of the luminaire controller to a mains supply mounted within a housing of the luminaire controller;
connecting a power switch module mounted within the housing to the mains supply by way of the mains input terminals;
switching, by a central processing module, between a '0-10V' interface and a DALI interface included in a dimming interface mounted within the housing in accordance with the type of receptacle provided on the luminaire and the '0-10V' or DALI protocol associated therewith; and
controlling, by the central processing module, the dimming interface and central processing functions of the luminaire controller.

\* \* \* \* \*